United States Patent Office 3,709,842
Patented Jan. 9, 1973

3,709,842
POROUS HYDROGELS AND METHOD OF
MANUFACTURING SAME
Artur Stoy, Prague, Czechoslovakia, assignor to Ceskoslovenska Akademie ved, Prague, Czechoslovakia
No Drawing. Filed Sept. 2, 1971, Ser. No. 177,494
Claims priority, application Czechoslovakia, Sept. 10, 1970, 6,207/70
Int. Cl. C08c 17/08; C08d 13/08; C08f 47/10
U.S. Cl. 260—2.5 R                                      8 Claims

ABSTRACT OF THE DISCLOSURE

This invention is for porous hydrogels of partly hydrolyzed polyacrylonitrile which are useful as sorbents and which are made by dissolving or swelling polyacrylonitrile in concentrated nitric acid at temperatures under 50° C. until the degree of hydrolysis desired is attained. The temperature is then increased to 50° C. to 85° C. until the polymer is foamed. The acid is then removed from the polymer by washing. Porophors may be added to the polymer acid mixture prior to the final heating phase.

---

The invention relates to porous hydrogels which are utilizable primarily as sorbents and which comprise partly hydrolyzed polyacrylonitrile, more particularly, the invention relates to a method of manufacturing such materials.

Ions of heavy metals are usually caught or trapped either by cation exchangers or by complex-forming compounds which bind ions through chelate bonds. Such sorbents are comparatively expensive and cannot be used universally since, as well known, they are likely to cause other undesirable side reactions.

In contrast, sorbents according to the invention are comparatively cheap, have a large surface area and thus high sorption capacity moreover, they may be easily adjusted for various purposes by changing the degree of partial hydrolysis of the polymer. It is, therefore, an object of this invention to provide porous, foamed hydrogel gel sorbents which have wide applicability and do not exhibit the disadvantage of cation exchangers and complex-forming compounds and the sorbent properties of which may be easily adjusted for various purposes and which are made by contacting polyacrylonitrile with concentrated nitric acid under specific conditions to dissolve or swell the polymer.

BRIEF SUMMARY OF THE INVENTION

In accordance with the invention the method of manufacturing porous, foamed hydrogels comprises contacting and hydrolyzing by dissolving or swelling polyacrylonitrile in concentrated nitric acid at temperatures below about 50° C. until the desired degree of hydrolysis is attained, raising the temperature to temperatures in a range of from about 50° C. to about 85° C. until the polymer is foamed, removing the acid by washing the polymer and obtaining a porous, foamed hydrogel.

PREFERRED EMBODIMENTS OF THE INVENTION

As mentioned, the polyacrylonitrile is dissolved or swollen in concentrated nitric acid at temperatures below about 50° C. until the desirable degree of hydrolysis is attained and thereafter raising the temperature to a temperature in a range of from about 50° C. to about 85° C. until the polymer is foamed and then washing out the acid from the spongy material.

The washing step may be carried out in a variety of ways. For example, washing may simply be achieved by immersing the spongy material in a water bath or by contacting the spongy material with a stream of water while cutting the material into pieces while simultaneously neutralizing the acid.

In addition, porophors, such as urea, starch, hydrogen peroxide tnd mixtures thereof may be added to the polymer and acid system prior to the final heating phase which takes place above 50° C.

As mentioned hereinabove, the sorbents made in accordance with this invention may be easily adjusted for various purposes by changing the degree of partial hydrolysis of the polymer. This may be brought about simply by changing the temperature and/or duration of the first phase of heating at temperatures below 50° C. Since time and temperature are inversely dependent on each other, it is possible to achieve the desired degree of hydrolysis either by keeping the polymer in nitric acid for a longer time at a lower temperature, for example from −10° C. to +30° C., or by a short heating period at a temperature that is higher, for example, between 30° C. and 50° C. The rate of hydrolysis also depends on the degree of branching or cross-linking, or, in other words, on the average molecular weight of the starting polyacrylonitrile. In this regard, the higher the average molecular weight, the lower the rate of hydrolysis.

The foaming is due to the reduction of nitric acid by the polymer, which is partly oxidized. If, however, an easily oxidizable material such as starch is added, oxidation of the polymer can be substantially avoided. Urea which is known as a stabilizer of polyacrylonitrile against oxidation by nitric acid at low temperatures can be used in the present process. However, when polyacrylonitrile in nitric acid is heated above 50° C. urea does not prevent the reduction of nitric acid, but increases the amount of gases evolved and then acts as a porophor rather than as a stabilizer. It is, however, possible to use as a porophor any compound capable of reacting with nitric acid at temperatures above 50° C. to liberate gases, but which is comparatively stable under lower temperatures at the same conditions.

Polyacrylonitrile may be prepared separately by known methods and then dissolved in nitric acid or welled therein. It is, however also possible in accordance with the invention to simply polymerize acrylonitrile in nitric acid.

The manufacture can be carried out continually so that a highly viscous polymer solution or an elastic gel of polyacrylonitrile in strong nitric acid is led continuously first through a zone kept at a temperature lower than 50° C. and then through a zone where the temperature is higher than 50° C. where the polymer solution or gel is foamed. The foamed polymer is then led into an aqueous bath where it is cut to small pieces and the acid is washed out and neutralized, if desired. In order to avoid loss of nitric acid and forming of acid waste waters, the spongy polymer is preferably washed by counter-current methods in aqueous solutions.

Porophores, such as urea, starch and the like, increase the number of pores and decrease their size. If a combination of soluble starch with urea is used, then the nitrous acid evolved by the reduction of nitric acid reacts with urea according to the equation

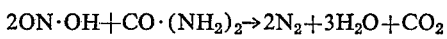

Nitrogen and carbon dioxide form pores, the surfaces of which are simultaneously coagulated by the liberated reaction water so that the pores are stabilized and do not collapse when the gases escape by diffusion. Urea is preferably added together with the polymer or monomer and starch may be added either to the polymer solution prior to heating over 50° C. or also to the monomer solution in nitric acid at the beginning of the polymerization.

The sorption properties depend primarily on the degree of partial hydrolysis of polyacrylonitrile. Some metal ions such as gold, silver, copper or palladium are caught or trapped rather by nitrile groups rather than by amide or carboxylic groups but nevertheless a certain degree of hydrolysis is essential to achieve some swelling in water so that all of the nitrile groups become accessible to the ions, to be sorbed. Other ions such as mercury, cadmium and many other cations are caught or trapped by amide and/or carboxylic groups so that more hydrolyzed polyacrylonitriles are more suitable. Silver and monovalent copper cations require the presence of both nitrile and acidic groups. In this case, it is possible to increase the capacity of the sorbent either by neutralizing the sorbent by strong alkaline solutions such as solutions of caustic soda, barium hydroxide or sodium carbonate, whereby the amount of carboxylic groups is increased by alkaline hydrolysis, or, preferably, by treating the still acid containing sorbent with nitrous acid or its salts. In this latter case the nitrile groups remain unchanged and only the amide groups react:

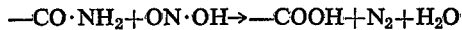

$$-CO \cdot NH_2 + ON \cdot OH \rightarrow -COOH + N_2 + H_2O$$

The sorbent with the amount of carboxylic groups thus increased may be further treated with hydroxylamine to transform it to a polyhydroxamic acid copolymer, with good complex-forming properties and enhanced sorption capacity for heavy metal cations such as nickel, manganese and the like.

The above mentioned transformations leading to increased amounts of acidic groups result in increased swelling capacity,. This is sometimes an undesired property and it can be controlled by subsequent cross-linking of amide groups by for example, formaldehyde in presence of mineral acids. Other suitable cross-linking agents are hexamethylenetetramine, dimethylol urea and the like. In some cases, ionic cross-linking by polyvalent cations such as $Al^{3+}$, $Fe^3$ or $Cr^{3+}$ may also be used, particularly in cases of sorbents with a relatively large number of acidic groups.

It is to be understood from the above that the capacity for various metal ions may be adjusted by the modification of the manufacturing process, as well as by the subsequent treatment of the sorbent. The sorbents of the invention are particularly valuable for recovering heavy metals from very dilute solutions thereof such as from various waste liquors. On the other hand, they are suitable for the purification of solutions or water to remove heavy metals therefrom where the latter are undesired, such as, for example in the manufacture of photographic light sensitive material. It is also possible to utilize the above described sorbents to isolate some compounds, such as antibiotics, from dilute solutions thereof. Other fields where the sorbents of the invention may be utilized are food and cosmetic manufacture, manufacture of polymer latices and all other cases where even traces of some heavy metals have detrimental effects. In addition, the porous hydrogels can also be used to make surgical prostheses and carriers for drugs and the like.

The invention is illustrated by following non-limitative examples. In the examples all parts and percents are by weight unless otherwise stated.

EXAMPLE 1

12 parts of acrylonitrile were dissolved in 88 parts of 65% nitric acid. 1 part of a 5% aqueous ammonium persulfate solution was then added and the solution of reactants was covered by a 10 mm. thick layer of paraffin oil. The solution of reactants was kept for 96 hours at 22° C. in darkness. Then the oil was removed, its remnants washed off with kerosene and the solution was heated in a water bath to 45° C. while stirring. After 6 hours 1 part of urea and then 0.2 part of dry potato starch were stirred in and the solution was poured into a large glass beaker heated to 75° C. The solution was thereby foamed and filled the whole beaker. The bright yellow foam was cooled and washed in a stream of water while simultaneously being cut into small pieces. Before the acid was entirely washed out, the sorbent was placed in a 3% aqueous formaldehyde solution and heated therein for 4 hours at 80° C. while slowly stirring. The sorbent was then separated and washed to neutral reaction and to remove all of the formaldehyde. It can be used for filling columns for sorption of heavy metals, such as uranium or mercury, from dilute solutions thereof. Desorption of the sorbent may be effectuated with dilute organic or inorganic acids.

EXAMPLE 2

One part of dimethylamino ethanol was dissolved in 27 parts of acrylonitrile and 1 part of a 10% aqueous potassium persulfate was dissolved in 71 parts of 65% decolorized nitric acid. The two solutions were mixed together, poured into a glass dish in a 10 mm. thick layer, and covered with a 5 mm. thick layer of white paraffin oil. After 6 days, the solution, kept in darkness, turned to an elastic gel. The oil was removed as described in Example 1 and the gel heated for 10 hours to 43° C. The temperature of the heating bath was increased to 80° C. The gel turned yellow and foamed. The elastic foam was removed from the dish under water and cut to small pieces while washing. The not yet entirely washed sorbent, still having an acid reaction, was immersed in a 5% aqueous sodium nitrite solution. The solution was maintained acidic by gradually adding small amounts of a mineral acid. The mixture was slowly stirred under a hood. The resulting macroporous sorbent was highly swellable in aqueous solutions, Its swelling capacity could be decreased by treating it with solutions containing trivalent chromium, aluminium or iron cations. The sorbent can be used for recovering metals of the platinum group from highly dilute solutions of their chlorides having a pH value between 6 and 7.

EXAMPLE 3

Polyacrylonitrile, having an average molecular weight of 95,000, prepared by the known polymerization and precipitation in water, was dried, pulverized and dissolved at 0° C. in 71% nitric acid to make a 7% solution. Simultaneously, 0.5% of urea and 3.3% of soluble starch were added to the solutions. After 6 days of standing at +10° C. the solution was led through a slightly inclined glass tube having an inner diameter of 40 mm., and a length of 2 mm., in a stream so that the solution filled less than ⅒ of the cross-section of the tube. 90% of the length of the tube was externally heated to 40–45°. The last 10%, however, was heated to 45–75° C., with the maximum temperature at the end. The solution foamed in the last portion of the tube and was immediately led into cold calcium nitrate solution where it was coagulated and drawn off by means of two small wheels with radially protruding prickles. In the solution pulverized calcium carbonate was suspended in the solution and the suspension was stirred to prevent sedimentation. The foamed polymer was cut to small pieces in a bath containing calcium nitrate in low concentration and again suspended in calcium carbonate. The comminuted polymer was washed in a third bath with a calcium carbonate suspension until neutralized and finally in a last bath consisting of pure water. The first three baths were flowed slowly in countercurrent to the polymer, the highly concentrated solution from the first bath being thickened by evaporation and converted to calcium nitrate dihydrate. The foamed polymer was used for filling columns for sorbing heavy metal ions from dilute solutions thereof.

EXAMPLE 4

30 parts of acrylonitrile and 0.1 part of urea were dissolved in 68 parts of 65% nitric acid. 2 parts of a 5% ammonium persulfate aqueous solution were added thereto. The solution was poured into a large dish made from polyvinylchloride in a 7 mm. thick layer, covered with a layer of oil as in Example 2 and with dark paper and held at 22° C. for 20 days. Then the oil was removed, the elastic foil of the polymer taken out and immersed into a 60° C. silicone oil until foamed. The foam was immersed into a cold aqueous suspension of barium carbonate and cut therein into small pieces. The polymer was stirred in the solution by means of a stirrer with a horizontal axis and broad blades so that the light material was repeatedly immersed into the solution. The so neutralized sorbent was washed and used as in foregoing examples. Pure barium nitrate was recovered from the first neutralizing bath in the usual way.

EXAMPLE 5

The monomer mixture according to Example 4 was left to polymerize and hydrolyze for 17 days at 23° C. in a 5 cm. thick layer in a 1000 ml. conical polyvinylchloride beaker. The foaming was induced by gradual heating in a bath at about 55° C. under a hood. When the foaming started, the heating was interrupted. As soon as the foam filled the beaker, the whole was immersed into ice cold water. After a while, the foamed mass was carefully taken out of the beaker while still immersed under the surface of the cold water bath. The foamed block was then put into a stirred bath with suspended pulverized calcium carbonate. The liquid was replaced several times during 24 hours by fresh water with some calcium carbonate suspended therein, the spongy swolled hydrogel being centrifuged each time to remove the liquid from the pores as far as possible. After the reaction of the liquid remained permanently neutral, the spongy hydrogel block was slowly dried and mechanically worked to the shape of a mammary prosthesis. The article was then put into an 0.8% sodium chloride solution in distilled water for 48 hours and sterilized therein by a 30 minute boiling. It was strong, very elastic and well compatible with living tissues.

What I claim is:
1. A method for manufacturing porous, foamed hydrogels comprising the steps of contacting and hydrolyzing polyacrylonitrile with concentrated nitric acid at temperatures below about 50° C. until the desired degree of hydrolysis is attained, increasing the temperature to temperatures in a range of from about 50° C. to about 85° C. until the polymer is foamed, washing the polymer and removing the nitric acid and obtaining a porous foamed hydrogel.
2. A method as defined in claim 1 wherein the foamed polymer is cut to pieces and the acid is removed by washing the polymer in a bath.
3. A method as defined in claim 1 wherein the polymer is washed in a solution which consists of a nitrate in which nitric acid is neutralized by the base of the nitrate used.
4. A method as defined in claim 3 wherein the base is added to the solution in the form of its carbonate.
5. A method as defined in claim 1 wherein a porophor capable of liberating gases at temperatures above about 50° C. is added to the reactant prior to the foaming.
6. A method as defined in claim 5 wherein the porophor is selected from the group consisting of urea, starch, hydrogen peroxide and mixtures thereof.
7. A method as defined in claim 1 wherein the polyacrylonitrile is dissolved in the nitric acid.
8. A method as defined in claim 1 wherein the polyacrylonitrile is swollen in the nitric acid.

References Cited

UNITED STATES PATENTS 2,707,707   5/1955   Schwarz _____ 260—2.5 R
3,044,970   7/1962   Baumeister _____ 260—2.5 D SAMUEL H. BLECH, Primary Examiner M. FOELAK, Assistant Examiner U.S. Cl. X.R.

260—2.5 R